United States Patent [19]

Yoshida et al.

[11] Patent Number: 4,733,319
[45] Date of Patent: Mar. 22, 1988

[54] HIGH-SPEED CURRENT LIMITING CIRCUIT BREAKER

[75] Inventors: Shigehiro Yoshida; Kazuhiro Yokouchi; Yuichi Wada; Masao Tomita; Kiyoshi Fukuda, all of Amagasaki, Japan

[73] Assignee: Mitsubishi Denki Kabushiki Kaisha, Tokyo, Japan

[21] Appl. No.: 789,562

[22] Filed: Oct. 21, 1985

[30] Foreign Application Priority Data

Nov. 7, 1984 [JP] Japan ................. 59-236439

[51] Int. Cl.$^4$ .............................. H02H 9/02
[52] U.S. Cl. ..................... 361/58; 324/126; 324/133; 361/88; 361/93
[58] Field of Search ........... 361/58, 88, 93, 42, 361/45; 323/233; 324/126, 133

[56] References Cited

U.S. PATENT DOCUMENTS

| | | | |
|---|---|---|---|
| 3,270,275 | 8/1960 | Latham, Jr. ............ | 323/233 |
| 3,786,466 | 1/1974 | Naito et al. ............ | 361/42 X |
| 3,868,552 | 2/1975 | Wickson ................ | 361/104 |
| 4,187,525 | 2/1980 | Nagura et al. .......... | 361/42 |
| 4,204,152 | 5/1980 | Imrie .................... | 324/126 |
| 4,297,741 | 10/1981 | Howell ................. | 361/93 |
| 4,327,390 | 4/1982 | Despiney ............... | 361/126 |

FOREIGN PATENT DOCUMENTS

| | | |
|---|---|---|
| 0147509 | 6/1984 | European Pat. Off. . |
| 1541800 | 6/1970 | Fed. Rep. of Germany ...... 323/233 |
| 2020425 | 11/1971 | Fed. Rep. of Germany . |

OTHER PUBLICATIONS

*Spannungswandler fur Hochspannungsanlagen mit kapazitivem Teiler und elektronischem Messverstarker*, Von P. Matthiessen und U. Wiegel, Bull.ASE/UCS71 (1980)9, 10 May, pp. 450–455.

*Primary Examiner*—A. D. Pellinen
*Assistant Examiner*—Jeffery A. Gaffin
*Attorney, Agent, or Firm*—Lowe, Price, LeBlanc, Becker & Shur

[57] ABSTRACT

A high-speed current limiting circuit breaker comprises a self-recovery type current limiting element for limiting a fault current, a parallel resistance connected in parallel with the self-recovery type current limiting element and a circuit breaker connected in series with the self-recovery type current limiting element, a fault voltage detector for detecting the voltage generated on the parallel resistance and thereby driving an electromagnetic repulsion coil for breaking the circuit breaker.

10 Claims, 10 Drawing Figures

HIGH-SPEED CURRENT LIMITING CIRCUIT BREAKER

FIELD OF THE INVENTION AND RELATED ART STATEMENT

1. Field of the Invention

The present invention relates to a high-speed current limiting circuit breaker for limiting and breaking a short-circuit current at a high-speed, and which can be used more frequently than conventional ones.

2. Description of the Related Art

Hitherto, a conventional current limiting circuit breaker as shown in FIG. 5 comprises a self-recovery type current limiting element 2 (hereinafter simply referred to as "current limiting element") connected in series with a circuit breaker 1 and in parallel with a resistance 3. A first current transformer 4 for detecting an over-current is provided between the current limiting element 2 and the circuit breaker 1. A first relay 5, for determining operation time and current of the circuit breaker 1 is controlled by an output of the current transformer 4. The circuit breaker 1 is tripped by a first trip coil 6 in response to a signal from the relay 5.

Further provided to the resistance 3 is a second current tranformer 7' for detecting operation of the current limiting element 2. A second relay 8' is responsive to an output of the second current transformer 7', and a second trip coil 9' for tripping the circuit breaker 1 is responsive to the output of the second relay 8'.

Operation of the current limiting circuit breaker in FIG. 5 is explained as follows with reference to the current versus time characteristic graph of FIG. 6 and current limiting breaking waveforms of FIG. 7. In FIG. 6, curve A represents operation time in accordance with the output of the first current transformer 4 as a function of current through the circuit breaker 1, and curve B represents evaporation time as a function of current through current limiting element 2. The curves A and B interesect each other at point C. Another curve D represents operation time in accordance with the output of the second current transformer 7' as a function of current of the circuit breaker 1. When the current flowing through the second transformer 7' as I'$_{CL}$, the circuit breaker 1 breaks circuit at a time t$_R$ as shown in FIG. 6. A curve E represents overall resultant operation time as a function of current through the current limiting circuit breaker 10'. The resultant operation time is a sum of the operation time of the circuit breaker 1, controlled by the output of the second current transformer 7' and an evaporation time of the current limiting element 2.

As shown in FIG. 6, in a current region which is smaller than a minimum set current value I$_a$, as well as a load current I$_L$ of the circuit breaker 1, the first relay 5 and hence the circuit breaker 1 are not driven by the output of the first current transformer 4. In a current region between the minimum set current value I$_a$ and a current I$_c$ at the intersection point C, as indicated by the curve A, the circuit breaker 1 operates before the current limiting element 2 evaporates as a result of the operation of the first relay 5, responding to the output of the first current transformer 4. In a current region between the current I$_c$ and a rating breaking current I$_{B2}$ of the current limiting element 2, which region includes a rating breaking current I$_{B1}$ of the circuit breaker 1, the current limiting element 2 firstly evaporates to increase the resistance value of the current limiting element 2 rapidly. As a result, a current flows in the parallel resistance 3, causing the second current transformer 7' and in turn the second relay 8' to operate. Accordingly, a current flows in the second trip coil 9' and the circuit breaker 1 breaks (opens). The curve E represents the total of these operation times.

Current-limiting and breaking in the current region between the current I$_c$ and the current I$_{B2}$ are described as follows with reference to FIG. 7. When a fault current, for example, an overcurrent I$_p$(r.m.s.), flows through the current limiting element 2, a total overcurrent i$_t$, which is detected by the first current transformer 4, varies as shown by curve i$_t$ of FIG. 7(a). Thus, when an overcurrent occurs at a time t$_o$, the current i$_{CLE}$ of the current limiting element 2 varies as shown by curve i$_{CLE}$ of FIG. 7(b). From the time t$_o$ to the time t$_m$, the value of the current i$_{CLE}$ is equal to the overcurrent i$_t$, and the current i$_{CLE}$ continues to flow until the current limiting element 2 evaporates. While the current limiting element 2 is evaporated, namely, at and after the time t$_m$, most of the overcurrent flows through the parallel resistance 3, since the resistance of the current limiting element 2 becomes extremely large compared to that of the resistance 3 as a result of the evaporation. The current i$_{CLE}$ of the current limiting element 2 thereby becomes limited to a small value.

Thus, while the current limiting element 2 is evaporated, a current as shown by curve i$_R$ of FIG. 7(c) flows through the parallel resistance 3. The second current transformer 7' detects the resistance current i$_R$, and thereby the second trip coil 9' causes the circuit breaker 1 to break the overcurrent at a time t$_t$.

The operation shown in FIG. 7 shows that the overcurrent it is limited to a current-limited peak value i$_p$, and after the current limiting, to a follow-current I$_{CL}$(r.m.s.), and breaks the circuit within a time of 2.5 cycles.

As apparent from the above-mentioned description, the time period t$_m$−t$_t$, namely from the starting time t$_m$ of the current limiting element 2 to the time t$_t$ at which the second trip coil 9' knocks the latch of the circuit breaker 1, is very long.

It is confirmed that the shorter the time from a fault occurence to the breaking of the overcurrent is, the longer the number of times of repeated use of the current limiting element 2 is.

Then, inventors improved such conventional known high-speed current limiting circuit breaker, and thereby have obtained an improved high-speed current limiting circuit having high-speed breaking operation, which is described as a related art, as mentioned below.

That is, such improved high-speed current limiting circuit is disclosed in the Japanese Patent Application Sho 58-212687 or U.S. patent application Ser. No. 615,738 of Yokouchi et al.

The above-mentioned improved high-speed current limiting circuit of the related art is described with reference to FIG. 8.

The parts 1 to 6 correspond to the parts 1 to 6 in FIG. 5. A current transformer 16 for detecting an operation of the current limiting element 2 is connected to a current detection pulse generator 17. The current detection pulse generator 17 is connected to a gate of a thyristor 7. The thyristor 7, a capacitor 8 (functioning as a power source) and an electro-magnetic repulsion coil 14' are connected in series, as shown in FIG. 8. A movable rod 10 is inserted in the electro-magnetic repulsion coil 14' which is disposed against the circuit breaker 1. A circuit 15 including a diode 16' and an A.C. power source 20 for energizing the capacitor 8, is connected across the capacitor 8. The diode 16' is for charging the capacitor 8.

When the overcurrent occurred and a current flows through the parallel resistance 3, the current transformer 16 detects the current and the current detection pulse generator 17 comprising an operational amplifier produces a trigger pulse. The trigger pulse turns on the thyristor 7. As a result of the turning on of the thyristor 7, the charged energy in the capacitor 8 is discharged through the electro-magnetic repulsion coil 14'. Accordingly, the movable rod 10 is transferred very quickly to the circuit breaker 1 by an electro-magnetic repulsion force produced between the movable rod 10 and the electro-magnetic repulsion coil 14'. Then the movable rod 10 knocks a latch (not shown in FIG. 8) of the circuit breaker 1, and thereby to break the circuit breaker 1.

In FIG. 9, waveforms (a), (b) and (c) correspond to those of FIGS. 7(a), (b) and (c). A waveform (d) of FIG. 9 shows a current $i_{th}$ which flows through the thyristor 7 and the electro-magnetic repulsion coil 14'. The waveforms (a), (b), (c) and (d) of FIG. 9 show that, after current flows through the parallel resistance 3, the thyristor 7 is made conductive in a very short time and the movable rod 10 is operated. The dotted lines in the waveforms (a), (b) and (c) of FIG. 9 indicate that the breaking of the overcurrent may be made at a time $t_t$, namely, in a time of one cycle, but in fact, breaking at an overcurrent is made only in 0.5 cycle. That is, the fact shows that the overcurrent is broken at a first zero-crossover point $t_t$, as shown by solid lines in the waveforms (a), (b) and (c) of FIG. 9. Therefore, it is confirmed that the rod 10 trips the latch in the circuit breaker 1 very shortly.

However, such high-speed current limiting circuit breaker of FIG. 8 has the following problems.

That is, the operation of the current limiting element 2, caused by the fault current and so on, is detected by detecting the current flowing through the parallel resistance 3 by utilizing the current transformer 16. Therefore, the high-speed current limiting circuit breaker has a large bulk on account of the existence of the current transformer 16.

Further, in actual high-speed current limiting circuit breakers applied to a high voltage circuit, usually two current limiting elements 2a, 2b are connected in series as shown in FIG. 10, and two parallel resistances 3a, 3b are connected to the current limiting elements 2a, 2b, respectively, as shown in FIG. 10, wherein a current transformer 16b is connected in series to the parallel resistance 3b. Under such case, when a trouble, for example, a getting out of order occurs on the current limiting element 2a so that a current becomes not to flow through the current limiting element 2a, the current $i_R$ flows through the parallel resistance 3a but does not flow through the parallel resistance 3b, that is, the current flows through the current limiting element 2b. Since the other current limiting element 2b has no trouble, the resistance of the current limiting element 2b is very low. In such case, the current transformer 16b cannot detect the current flow, namely, the trouble of the current limiting element 2a. Such disadvantage may be overcome by connecting another current transformer 16a in series to the parallel resistance 3a. But such provision of the two current transformers 16a and 16b make the high-speed current limiting circuit breaker more bulky and more expensive.

OBJECT AND SUMMARY OF THE INVENTION

The present invention intends to offer an improved high-speed current limiting circuit breaker which is small in bulk and cost by avoiding redundant use of the current transformer 7' or 16.

A high-speed current limiting circuit breaker of the present invention comprises a self-recovery type current limiting element for limiting a fault current, a parallel resistance connected in parallel with the self-recovery type current limiting element, a circuit breaker connected in series with the self-recovery type current limiting element, a fault current detector for detecting a fault current flowing through the circuit breaker, a breaker tripping means for tripping the circuit breaker in response to an output of the fault current detector, a fault voltage detector for detecting a fault voltage generated on the parallel resistance, a switching element connected with and actuated by the fault voltage detector, an electro-magnetic repulsion coil which is connected in series with the switching element and a power source in a manner to be excited when the switching element is actuated, and a movable rod for breaking the circuit breaker by tripping a latch in the circuit breaker by electro-magnetic repulsion when the electro-magnetic repulsion coil is excited.

DESCRIPTION OF THE PREFERRED EMBODIMENTS

Figure 1:
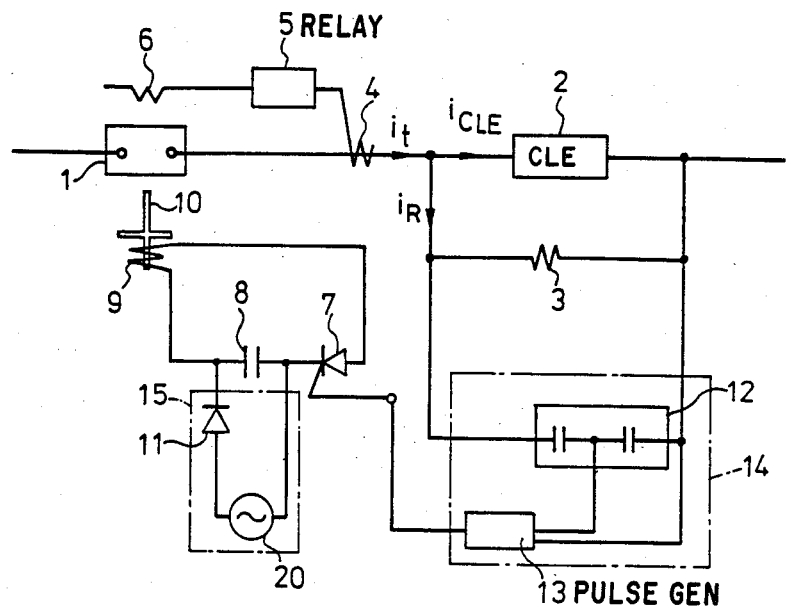
FIG. 1 is a circuit block diagram of an embodiment of a high-speed current limiting circuit breaker of the present invention.

In FIG. 1, a current limiting element 2 is connected in series with a circuit breaker 1 and, a parallel resistance 3 is connected in parallel with the current limiting element 2. A transformer 4 for detecting an overcurrent is provided between the current limiting element 2 and the circuit breaker 1. A relay 5, for determining operation time and operation current of the circuit breaker 1 is connected so as to be actuated by the current transformer 4. A trip coil 6 for tripping the circuit breaker 1 is connected with the relay 5. A voltage divider 12 is connected in parallel with the parallel resistance 3. The voltage divider 12 comprises, for example, two capacitors connected in series with each other as shown in FIG. 1.

A voltage detection pulse genertor 13 is connected with the voltage divider 12 for detecting a voltage produced by dividing the voltage generated on the parallel resistance 3. The voltage detection pulse generator 13 generates a pulse signal when the voltage detection pulse generator 13 detects a predetermined voltage from the voltage divider 12. A fault voltage detector 14 comprises the voltage divider 12 and the voltage detection pulse generator 13.

The voltage detection pulse generator 13 is connected with a gate of a thyristor 7. The thyristor 7, a capacitor 8 (functioning as a power source) and an electro-magnetic repulsion coil 9 are connected in series, as shown in FIG. 1. A movable rod 10 is inserted in the electro-magnetic repulsion coil 9 which is disposed against the circuit breaker 1. A circuit 15 including a diode 11 and an A.C. power source 20 for energizing the capacitor 8 is connected across the capacitor 8. The diode 11 is for charging the capacitor 8.

Operation of the high-speed current limiting circuit breaker in FIG. 1 is described as follows.

When a fault current, for example, an over-current, flows through the current limiting element 2, the current limiting element 2 is evaporated, and as a result a current flows through the parallel resistance 3. Therefore, a voltage is produced between both terminals of the parallel resistance 3. The voltage divider 12 divides the produced voltage. The voltage detection pulse generator 13 detects a predetermined voltage or higher one generated on the parallel registance 3 and generates a trigger pulse. The trigger pulse is supplied to the thyristor 7. The trigger pulse turns on the thyristor 7. As a result of the turning on of the thyristor 7, the energy charged in the capacitor 8 is discharged through the electromagnetic repulsion coil 9. Accordingly, the movable rod 10 is transferred very quickly to the circuit breaker 1 by an electro-magnetic repulsion force produced between the movable rod 10 and the electro-magnetic repulsion coil 9. Then the movable rod 10 knocks a known latch (not shown) of the circuit breaker 1, and thereby to break the circuit breaker 1.

As apparent from the above-mentioned description, the high-speed current limiting circuit breaker of the present invention reacts with the operation of the current limiting element 2 by detecting the voltage, and therefore a conventional current transformer 7' which is, for example, a window type current transformer, is not utilized in the present invention. Accordingly, the distance between the current limiting element 2 and the parallel resistance 3 can be made as short as possible and therefore the bulk of the high-speed current limiting circuit breaker of the present invention can be made very small.

Figure 4:
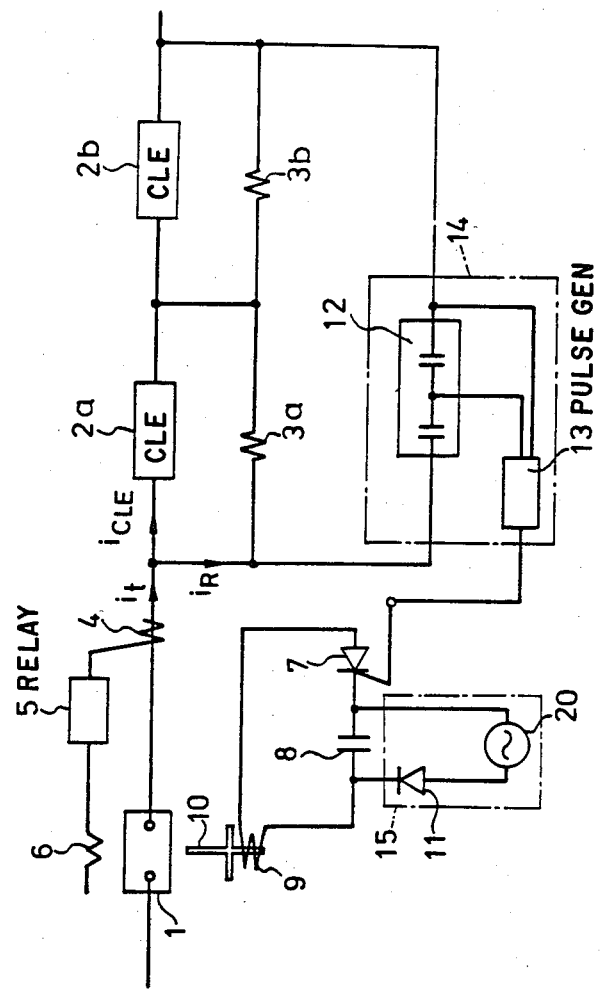
FIG. 4 is a circuit block diagram of another embodiment of the high-speed current limiting circuit breaker for a high voltage circuit, of the present invention.
Figure 5:
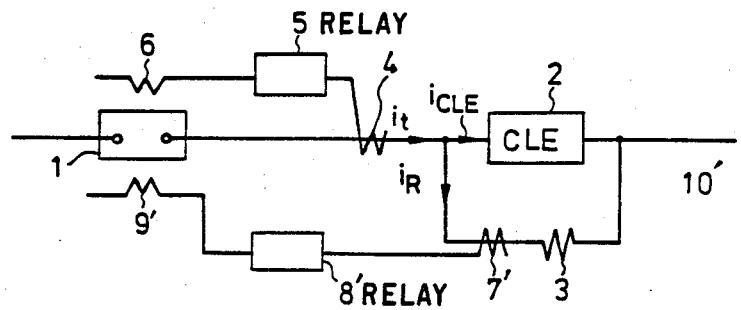
FIG. 5 is the circuit block diagram of the conventional high-speed current limiting circuit breaker.

In FIG. 4, another embodiment of the present invention applied to a high voltage circuit is disclosed. Two current limiting elements 2a and 2b are connected in series as a current limiting element. To each current limiting element 2a, 2b, parallel registances 3a, 3b are connected in parallel as shown in FIG. 4. The voltage divider 12 is connected to the parallel registances 3a, 3b as shown in FIG. 4.

When a trouble occurs on the current limiting element 2a itself and a current becomes not to flow through the current limiting element 2a, a current flows through the parallel registance 3a and therefore a voltage between both terminals of the parallel registance 3a is produced. Thus the voltage detector 13 detects the trouble of the current limiting element 2a through the voltage divider 12, and breaks the breaker 1.

When a trouble occurs on the current limiting element 2b itself, the voltage detection pulse generator 13 can detect the trouble of the current limiting element 2b likewise.

Further, when the current limiting element 2a or the current limiting element 2b evaporates on account of the fault current, the voltage detector 13 can detect the fault current likewise and can break the breaker 1.

Thus, the application of the high-speed current limiting circuit breaker of the present invention to the high voltage circuit can be realized by utilizing only a single voltage divider 12. Therefore, the bulk of the high speed current limiting circuit breaker can be made small.

Figure 2:
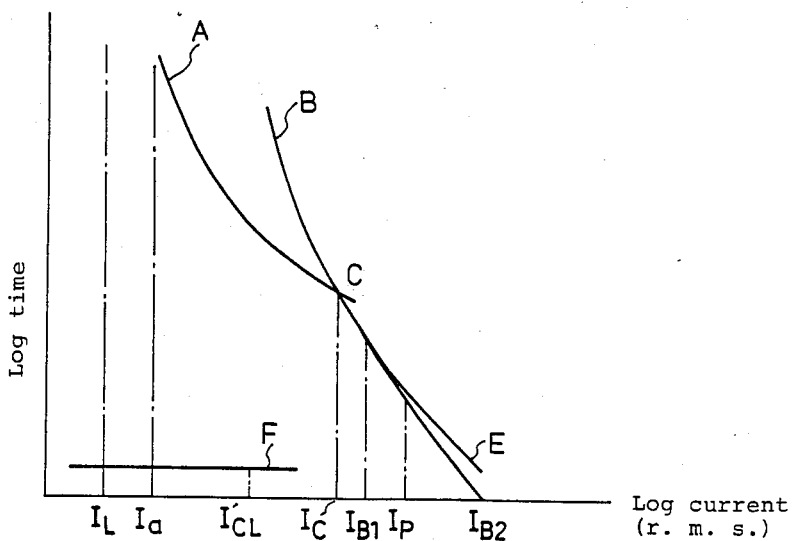
FIG. 2 is a graph of the operation time vs. current characteristic of a high-speed current limiting circuit breaker of the present invention.
Figure 6:
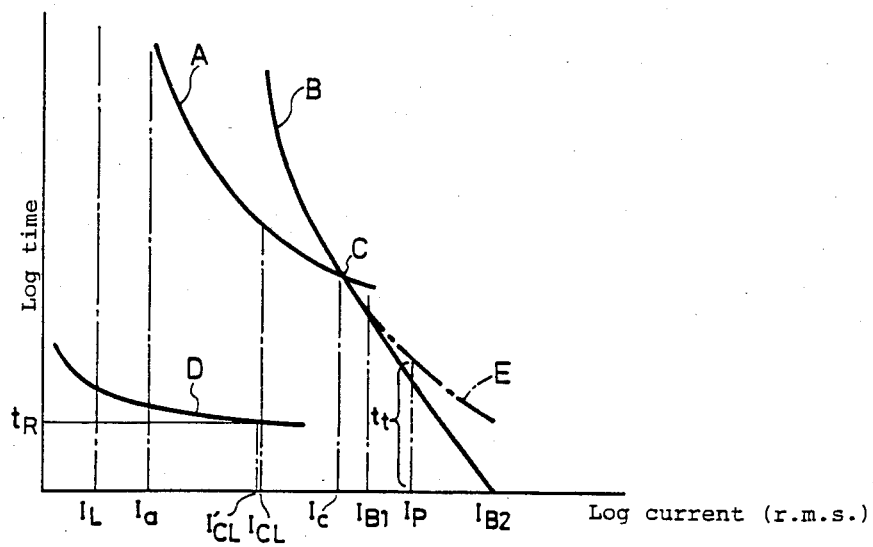
FIG. 6 is the graph of the operation time vs. current characteristic of the conventional high-speed current limiting circuit breaker.
Figure 7:
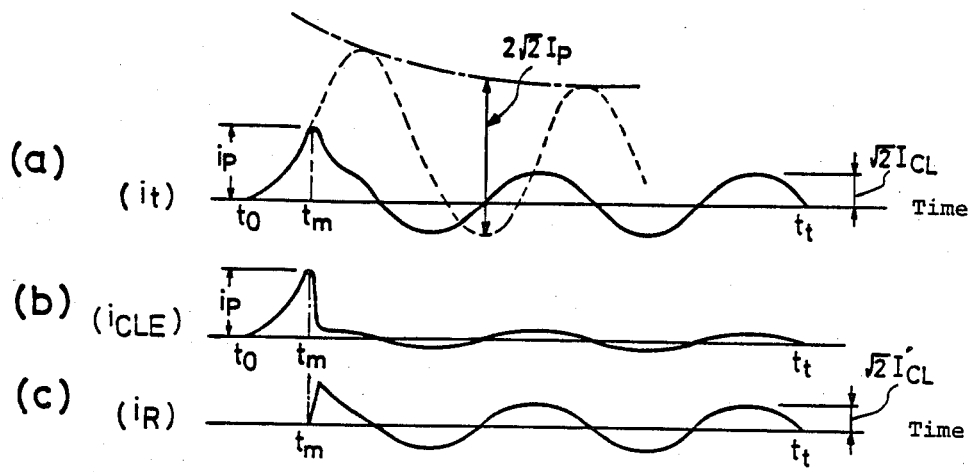
FIGS. 7(a), (b) and (c) are the time charts, showing the operation of the conventional high-speed current limiting circuit breaker.
Figure 8:
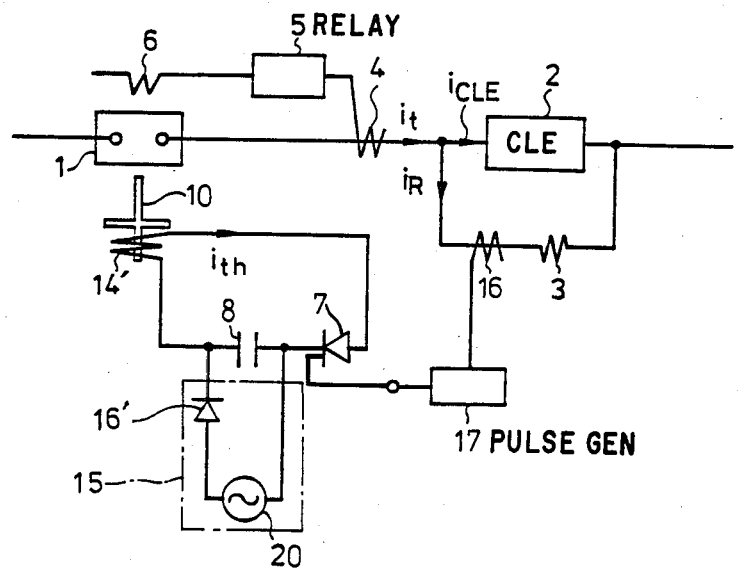
FIG. 8 is the circuit block diagram of the example of the related art with the high-speed current limiting circuit breaker.

FIG. 2 is a graph of characteristic curves of the operation time versus current of the embodiment of the present invention. The operation of the high-speed current limiting circuit breaker of the present invention is almost similar to that of the conventional one in FIG. 6. However, the operation characteristic of the circuit breaker 1 in accordance with the output of the voltage detection pulse generator 13, is determined in accordance with the current $i_{th}$ due to the conduction of the thyristor 7. Therefore, the characteristic curve is constant as shown by a curve F. From a comparison of the curve F of FIG. 2 with the conventional curve D of FIG. 6, it is apparent that the operation of the circuit breaker 1 in accordance with the output of the voltage detection pulse generator 13 is executed at very high speed.

Figure 3:
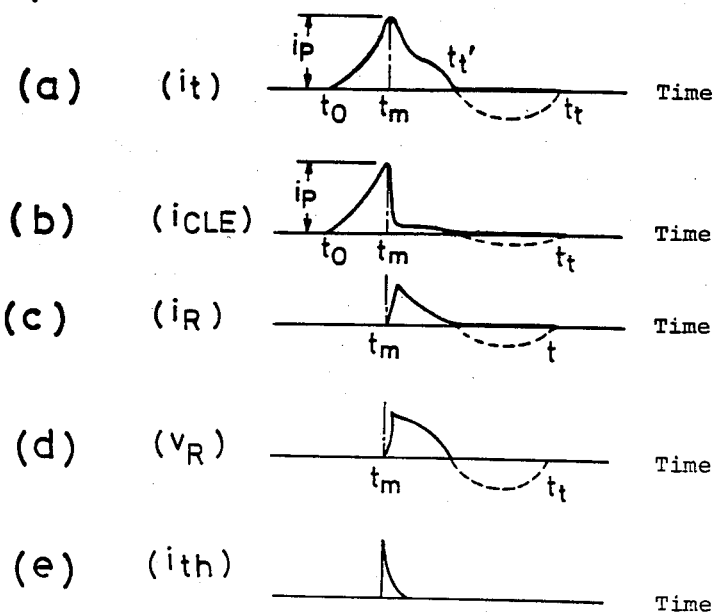
FIGS. 3(a), (b), (c), (d) and (e) are graphs of a current breaking characteristic of the high-speed current limiting circuit breaker of the present invention.
Figure 9:
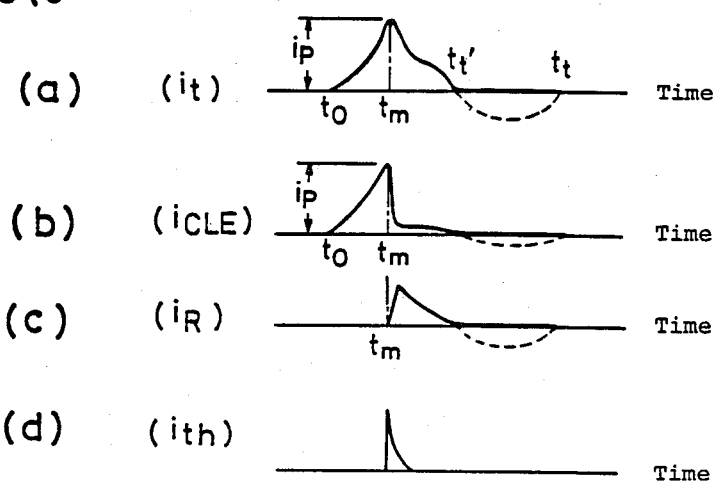
FIGS. 9(a), (b), (c) and (d) are the time charts showing the operation of the high-speed current limiting circuit breaker of the related art in FIG. 8.
Figure 10:
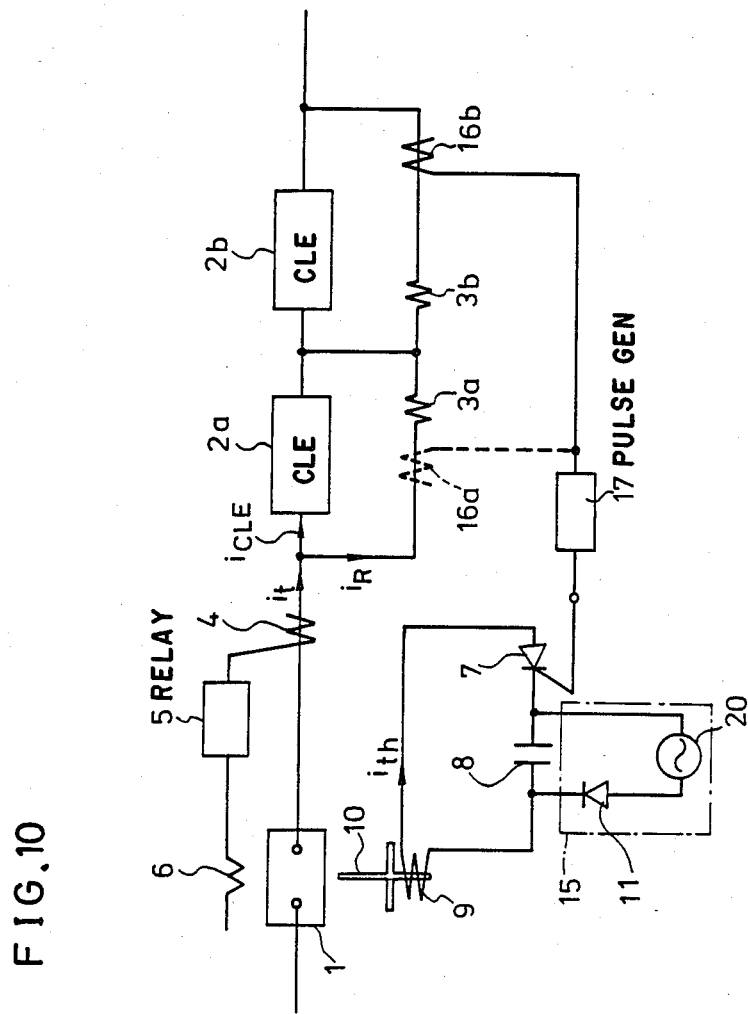
FIG. 10 is the circuit block diagram of the other example of the related art with the high-speed current limiting circuit breaker.

Further, current-limiting and breaking in the current region between the current $I_C$ and the current $I_{B2}$ in FIG. 2 are described as follows with reference to FIGS. 3(a), (b), (c), (d) and (e). FIGS. 3(a), (b), (c) and (e) are corresponding to the FIGS. 9(a), (b), (c) and (d) respectively. When a fault current, for example, an overcurrent $I_p$(r.m.s.), flows through the current limiting element 2, most of the overcurrent flow through parallel resistance 3.

Thus, while the current limiting element 2 is evaporated, a current as shown by curve $i_R$ of FIG. 3(c) flows through the parallel resistance 3. Therefore, a volage $V_R$ is generated between both terminals of the resistance 3. FIG. 3(d) shows the variation of the voltage $V_R$. The produced voltage $V_R$ is detected by the voltage detection pulse generator 13.

Besides the above-mentioned embodiments wherein a capacitor voltage divider is used as the voltage divider 12, a resistance voltage divider or a resistance and capacitor voltage divider can be used also as the voltage divider 12.

We claim:

1. A high-speed current limiting circuit breaker comprising:
   a self-recovery type current limiting element for limiting a fault current,
   a parallel resistance connected in parallel with said self-recovery type current limiting element,
   a circuit breaker connected in series with said self-recovery type current limiting element,
   a fault current detector for detecting a fault current flowing through said circuit breaker,
   a breaker tripping means for tripping said circuit breaker in response to an output of said fault current detector,
   a fault voltage detector for detecting a fault voltage generated on said parallel resistance,
   a switching element connected with and actuated by said fault voltage detector,
   an electro-magnetic repulsion coil which is connected in series with said switching element and a power source in a manner to be excited when said switching element is actuated, and
   a movable rod for breaking said circuit breaker by tripping a latch in said circuit breaker by electro-magnetic repulsion when said coil is excited;
   wherein said fault voltage detector comprises a voltage divider and a voltage detection pulse generator which detects the voltage generated on the parallel resistance and drives said repulsion coil.

2. A high-speed current limiting circuit breaker in accordance with claim 1, wherein
   said switching element is a thyristor.

3. A high-speed current limiting circuit breaker in accordance with claim 2, wherein
   said power source is a capacitor which is connected in series with said switching element and electro-magnetic repulsion coil.

4. A high-speed current limiting circuit breaker in accordance with claim 1, wherein
   said power source is a capacitor which is connected in series with said switching element and electro-magnetic repulsion coil.

5. A high-speed current limiting circuit breaker in accordance with claim 1, wherein
   said voltage divider comprises series connected capacitors.

6. A high-speed current limiting circuit breaker comprising:
   a plurality of series connected self-recovery type current limiting elements for limiting a fault current,
   a different resistance connected in parallel with each of said series connected self-recovery type current limiting elements,
   a circuit breaker connected in series with said self-recovery type current limiting elements,
   a fault current detector for detecting a fault current flowing through said circuit breaker,
   a breaker tripping means for tripping said circuit breaker in response to an output of said fault current detector,
   a fault voltage detector for detecting a fault voltage generated across all said parallel resistances,
   a switching element connected with and actuated by said fault voltage detector,
   an electro-magnetic repulsion coil which is connected in series with said switching element and a power source in a manner to be excited when said switching element is actuated, and
   a movable rod for breaking said circuit breaker by tripping a latch in said circuit breaker by electro-magnetic repulsion when said coil is excited;
   wherein said fault voltage detector comprises a voltage divider and a voltage detection pulse generator which detects the voltage generated across the parallel resistances and drives said repulsion coil.

7. A high-speed current limiting circuit breaker in accordance with claim 6, wherein
   said switching element is a thyristor.

8. A high-speed current limiting circuit breaker in accordance with claim 7, wherein
   said power source is a capacitor which is connected in series with said switching element and electro-magnetic repulsion coil.

9. A high-speed current limiting circuit breaker in accordance with claim 8, wherein
   said power source is a capacitor which is connected in series with said switching element and electro-magnetic repulsion coil.

10. A high-speed current limiting circuit breaker in accordance with claim 6 wherein
    said voltage divider comprises series connected capacitors.

* * * * *